United States Patent
Yan

(10) Patent No.: US 10,154,213 B2
(45) Date of Patent: Dec. 11, 2018

(54) IMAGE SENSORS HAVING DARK PIXELS

(71) Applicant: SEMICONDUCTOR COMPONENTS INDUSTRIES, LLC, Phoenix, AZ (US)

(72) Inventor: Hai Yan, San Ramon, CA (US)

(73) Assignee: SEMICONDUCTOR COMPONENTS INDUSTRIES, LLC, Phoenix, AZ (US)

( * ) Notice: Subject to any disclaimer, the term of this patent is extended or adjusted under 35 U.S.C. 154(b) by 62 days.

(21) Appl. No.: 15/278,205

(22) Filed: Sep. 28, 2016

(65) Prior Publication Data

US 2018/0091748 A1 Mar. 29, 2018

(51) Int. Cl.
*H04N 5/217* (2011.01)
*H04N 5/361* (2011.01)
*H04N 5/365* (2011.01)
*H04N 5/378* (2011.01)
*H04N 5/357* (2011.01)

(52) U.S. Cl.
CPC .......... *H04N 5/361* (2013.01); *H04N 5/3575* (2013.01); *H04N 5/3655* (2013.01); *H04N 5/378* (2013.01)

(58) Field of Classification Search
CPC ........ H04N 5/357; H04N 5/217; H04N 5/365; H04N 5/2176; H04N 5/2178; H04N 5/361
See application file for complete search history.

(56) References Cited

U.S. PATENT DOCUMENTS

| | | | | |
|---|---|---|---|---|
| 7,133,073 B1* | 11/2006 | Neter | ............... | H04N 5/3454 348/272 |
| 2005/0243193 A1* | 11/2005 | Gove | ............... | H04N 5/3575 348/241 |
| 2008/0012966 A1 | 1/2008 | Beck et al. | | |
| 2008/0239111 A1* | 10/2008 | Jiang | ............... | H04N 5/361 348/243 |
| 2009/0033779 A1* | 2/2009 | Mo | ............... | H04N 5/361 348/308 |
| 2009/0273691 A1 | 11/2009 | Mo et al. | | |
| 2010/0020213 A1 | 1/2010 | Mauritzson | | |
| 2012/0212657 A1* | 8/2012 | Mo | ............... | H04N 5/378 348/300 |
| 2014/0240569 A1* | 8/2014 | Yang | ............... | H04N 5/361 348/308 |

* cited by examiner

*Primary Examiner* — Kelly L Jerabek
(74) *Attorney, Agent, or Firm* — Treyz Law Group, P.C.; Joseph F. Guihan

(57) ABSTRACT

An imaging sensor may include an array of imaging pixels and at least two rows of dark pixels. Each imaging pixel may include a photodiode that generates charge in response to incident light. Each dark pixel may include a photodiode that is shielded from incident light by shielding material. The at least two rows of dark pixels may be sampled simultaneously and averaged to obtain an average dark pixel charge level. The average dark pixel charge level may be subtracted from each imaging pixel charge level to correct the imaging pixel charge levels for noise. Each column of dark pixels may include a column line that is coupled to first and second readout circuits. Each column line may be coupled to first and second current sources. Each column line may be coupled to at least one capacitor.

19 Claims, 7 Drawing Sheets

IMAGE SENSORS HAVING DARK PIXELS

BACKGROUND

This relates generally to imaging devices, and more particularly, to imaging devices having dark pixels.

Image sensors are commonly used in electronic devices such as cellular telephones, cameras, and computers to capture images. In a typical arrangement, an image sensor includes an array of image pixels arranged in pixel rows and pixel columns. Circuitry may be coupled to each pixel column for reading out image signals from the image pixels.

Typical image pixels contain a photodiode for generating charge in response to incident light. Image pixels may also include a charge storage region for storing charge that is generated in the photodiode. Image sensors can operate using a global shutter or a rolling shutter scheme. In a global shutter, every pixel in the image sensor may simultaneously capture an image, whereas in a rolling shutter each row of pixels may sequentially capture an image.

Some image sensors may include dark pixels to help correct for pixel noise. The dark pixels may include photodiodes that are shielded to prevent the dark pixel photodiodes from being exposed to incident light, ensuring that any generated charge is merely noise. Although helpful for noise correction, dark pixels may take up valuable area in the image sensor.

It would therefore be desirable to be able to provide improved arrangements for dark pixels in image sensors.

DETAILED DESCRIPTION

Electronic devices such as digital cameras, computers, cellular telephones, and other electronic devices may include image sensors that gather incoming light to capture an image. The image sensors may include arrays of image pixels. The pixels in the image sensors may include photosensitive elements such as photodiodes that convert the incoming light into image signals. Image sensors may have any number of pixels (e.g., hundreds or thousands or more). A typical image sensor may, for example, have hundreds of thousands or millions of pixels (e.g., megapixels). Image sensors may include control circuitry such as circuitry for operating the image pixels and readout circuitry for reading out image signals corresponding to the electric charge generated by the photosensitive elements.

Figure 1:
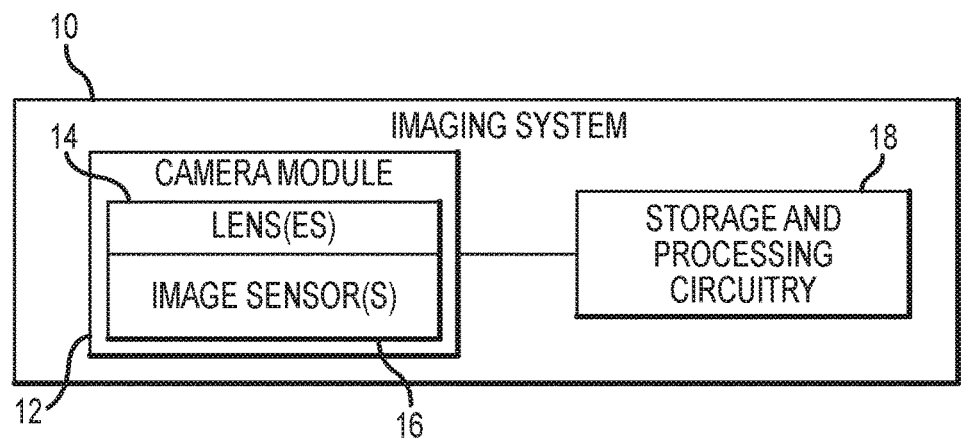
FIG. 1 is a diagram of an illustrative electronic device having an image sensor and processing circuitry for capturing images using an array of image pixels in accordance with an embodiment.

FIG. 1 is a diagram of an illustrative imaging system such as an electronic device that uses an image sensor to capture images. Electronic device 10 of FIG. 1 may be a portable electronic device such as a camera, a cellular telephone, a tablet computer, a webcam, a video camera, a video surveillance system, an automotive imaging system, a video gaming system with imaging capabilities, or any other desired imaging system or device that captures digital image data. Camera module 12 may be used to convert incoming light into digital image data. Camera module 12 may include one or more lenses 14 and one or more corresponding image sensors 16. Lenses 14 may include fixed and/or adjustable lenses and may include microlenses formed on an imaging surface of image sensor 16. During image capture operations, light from a scene may be focused onto image sensor 16 by lenses 14. Image sensor 16 may include circuitry for converting analog pixel data into corresponding digital image data to be provided to storage and processing circuitry 18. If desired, camera module 12 may be provided with an array of lenses 14 and an array of corresponding image sensors 16.

Storage and processing circuitry 18 may include one or more integrated circuits (e.g., image processing circuits, microprocessors, storage devices such as random-access memory and non-volatile memory, etc.) and may be implemented using components that are separate from camera module 12 and/or that form part of camera module 12 (e.g., circuits that form part of an integrated circuit that includes image sensors 16 or an integrated circuit within module 12 that is associated with image sensors 16). Image data that has been captured by camera module 12 may be processed and stored using processing circuitry 18 (e.g., using an image processing engine on processing circuitry 18, using an imaging mode selection engine on processing circuitry 18, etc.). Processed image data may, if desired, be provided to external equipment (e.g., a computer, external display, or other device) using wired and/or wireless communications paths coupled to processing circuitry 18. Image sensor 16 and processing circuitry 18 may be implemented using a stacked-chip arrangement if desired.

Figure 2:
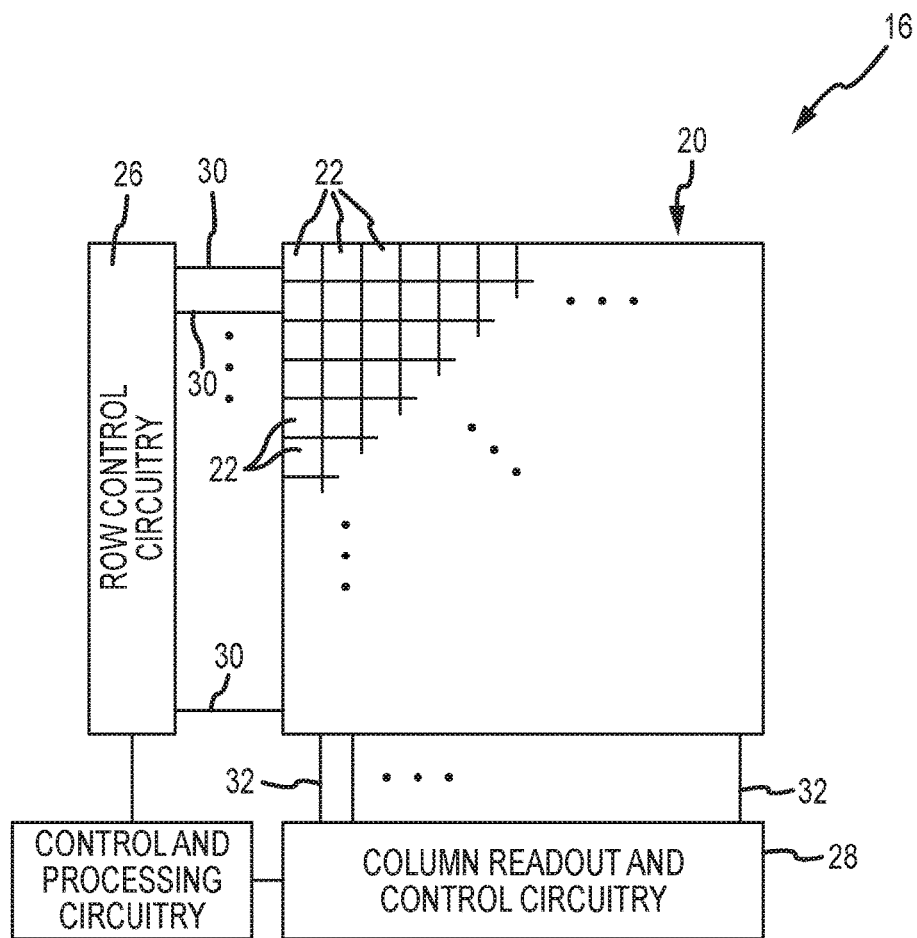
FIG. 2 is a diagram of an illustrative pixel array and associated readout circuitry for reading out image signals from the pixel array in accordance with an embodiment.

As shown in FIG. 2, image sensor 16 may include a pixel array 20 containing image sensor pixels 22 arranged in rows and columns (sometimes referred to herein as image pixels or pixels) and control and processing circuitry 24. Array 20 may contain, for example, hundreds or thousands of rows and columns of image sensor pixels 22. Control circuitry 24 may be coupled to row control circuitry 26 and image readout circuitry 28 (sometimes referred to as column control circuitry, readout circuitry, processing circuitry, or column decoder circuitry). Row control circuitry 26 may receive row addresses from control circuitry 24 and supply corresponding row control signals such as reset, row-select, charge transfer, dual conversion gain, and readout control signals to pixels 22 over row control paths 30. One or more conductive lines such as column lines 32 may be coupled to each column of pixels 22 in array 20. Column lines 32 may be used for reading out image signals from pixels 22 and for supplying bias signals (e.g., bias currents or bias voltages) to pixels 22. If desired, during pixel readout operations, a pixel row in array 20 may be selected using row control circuitry 26 and image signals generated by image pixels 22 in that pixel row can be read out along column lines 32.

Image readout circuitry 28 may receive image signals (e.g., analog pixel values generated by pixels 22) over column lines 32. Image readout circuitry 28 may include sample-and-hold circuitry for sampling and temporarily storing image signals read out from array 20, amplifier circuitry, analog-to-digital conversion (ADC) circuitry, bias circuitry, column memory, latch circuitry for selectively enabling or disabling the column circuitry, or other circuitry that is coupled to one or more columns of pixels in array 20 for operating pixels 22 and for reading out image signals from pixels 22. ADC circuitry in readout circuitry 28 may convert analog pixel values received from array 20 into corresponding digital pixel values (sometimes referred to as digital image data or digital pixel data). Image readout circuitry 28 may supply digital pixel data to control and processing circuitry 24 and/or processor 18 (FIG. 1) over path 25 for pixels in one or more pixel columns.

If desired, image pixels 22 may include one or more photosensitive regions for generating charge in response to image light. Photosensitive regions within image pixels 22 may be arranged in rows and columns on array 20. Pixel array 20 may be provided with a color filter array having multiple color filter elements which allows a single image sensor to sample light of different colors. As an example, image sensor pixels such as the image pixels in array 20 may be provided with a color filter array which allows a single image sensor to sample red, green, and blue (RGB) light using corresponding red, green, and blue image sensor pixels arranged in a Bayer mosaic pattern. The Bayer mosaic pattern consists of a repeating unit cell of two-by-two image pixels, with two green image pixels diagonally opposite one another and adjacent to a red image pixel diagonally opposite to a blue image pixel. In another suitable example, the green pixels in a Bayer pattern are replaced by broadband image pixels having broadband color filter elements (e.g., clear color filter elements, yellow color filter elements, etc.). These examples are merely illustrative and, in general, color filter elements of any desired color and in any desired pattern may be formed over any desired number of image pixels 22.

Figure 3A:
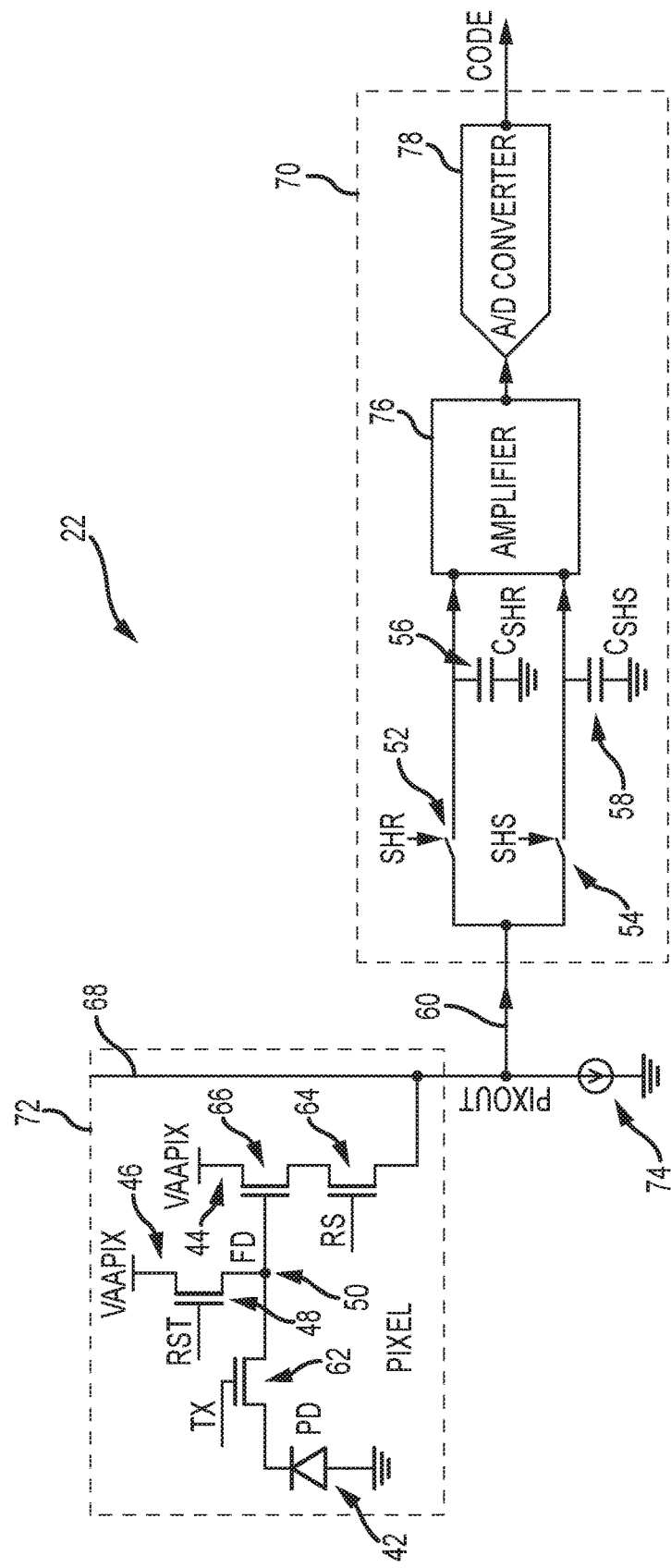
FIG. 3A is a circuit diagram of an illustrative image sensor pixel in accordance with an embodiment.
Figure 3B:
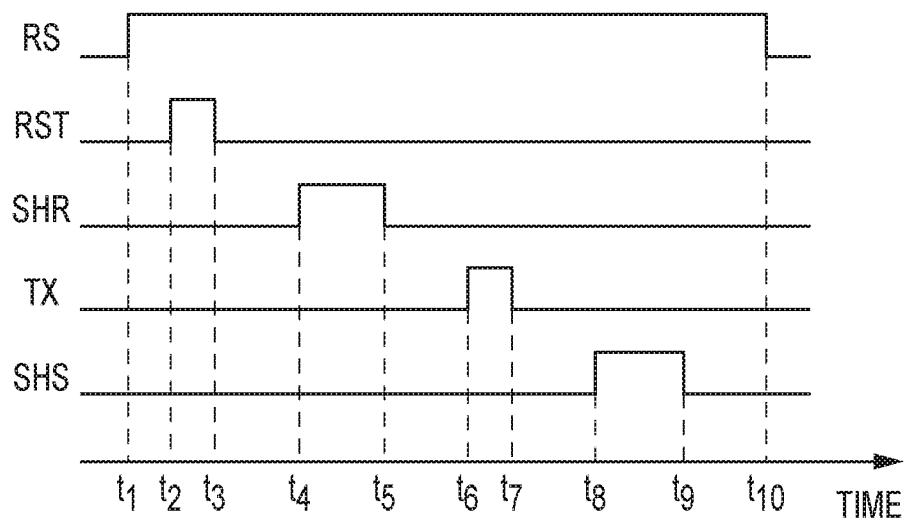
FIG. 3B is a timing diagram for operating an illustrative image sensor pixel such as the pixel in FIG. 3A in accordance with an embodiment.

Circuitry of an illustrative image pixel 22 of image sensor 16 is shown in FIG. 3A. A timing diagram demonstration the operation of pixel 22 is shown in FIG. 3B. As shown in FIG. 3A, pixel 22 may include pixel circuitry 72 and readout circuitry 70. Pixel 22 may include a photosensitive element such as photodiode 42 (PD). A bias voltage (e.g., voltage VAAPIX) may be supplied to positive power supply lines 44 and 46. If desired, the same bias voltage may supplied to both power supply lines 44 and 46 (i.e., lines 44 and 46 may be shorted together). Alternatively, different bias voltages may be supplied to positive power supply lines 44 and 46. Incoming light is collected by photodiode 42 after passing through a color filter structure. Photodiode 42 converts the light to electrical charge.

Before an image is acquired, row select signal RS may be asserted at $t_1$. When signal RS is asserted, transistor 64 turns on and a corresponding output signal (pixout) that is representative of the magnitude of the charge on charge storage node 50 is produced on output path 60. The signal associated with the stored charge on node 50 is conveyed to row select transistor 64 by source-follower transistor 66. In a typical configuration, there are numerous rows and columns of pixels such as pixel 22 in the image sensor pixel array of a given image sensor. A vertical conductive path such as path 68 may be associated with each column of pixels. Path 68 may be coupled to current source 74.

When signal RS is asserted in a given row, path 68 can be used to route an output signal (pixout) from that row to readout circuitry 70 (sometimes referred to herein as a readout circuit). Reset control signal RST may then be asserted. As shown in FIG. 3B, the reset control signal may be asserted at t2. This turns on reset transistor 48 and resets charge storage node 50 (also referred to as floating diffusion FD) to VAAPIX. The reset control signal RST may then be deasserted at time t3 to turn off reset transistor 48. After the reset process is complete, the charge level at floating diffusion node 50 may be sampled by asserting sample and hold reset signal SHR at $t_4$. Asserting sample and hold reset signal SHR may result in switch 52 coupling output line 60 to sample and hold reset capacitor 56 ($C_{SHR}$). Thus, the charge level at floating diffusion node 50 after resetting floating diffusion node 50 will be stored in capacitor 56. Once the reset charge level is stored at capacitor 56, the sample and hold reset signal may be deasserted at $t_5$.

Next, transfer gate control signal TX may be asserted at $t_6$ to turn on transfer transistor (transfer gate) 62. When transfer transistor 62 is turned on, the charge that has been generated by photodiode 42 in response to incoming light is transferred to charge storage node 50. Transfer gate control signal TX may be deasserted at time $t_7$ after the transfer in charge is complete.

Once the charge has been transferred from photodiode 42 to floating diffusion node 50, the charge level at floating diffusion node 50 may be sampled by asserting sample and hold signal SHS at $t_8$. Asserting sample and hold signal SHS may result in switch 54 coupling output line 60 to sample and hold signal capacitor 58 ($C_{SHS}$). Thus, the sample charge level at floating diffusion node 50 will be stored in capacitor 58. Once the sample charge level is stored at capacitor 58, the sample and hold signal may be deasserted at $t_9$.

Charge storage node 50 may be implemented using a region of doped semiconductor (e.g., a doped silicon region formed in a silicon substrate by ion implantation, impurity diffusion, or other doping techniques). The doped semiconductor region (i.e., the floating diffusion FD) exhibits a capacitance that can be used to store the charge that has been transferred from photodiode 42.

Readout circuitry 70 may include an amplifier 76 coupled to capacitors 56 and 58. Amplifier 76 may be coupled to an analog to digital converter 78. Analog to digital converter 78 (sometimes referred to as an A/D converter or an ADC) may output digital code that is representative of the light received by the pixel during the integration period.

If desired, other types of image pixel circuitry may be used to implement the image pixels of sensor 16. For example, image pixels in image sensor 14 may be three-transistor pixels, pin-photodiode pixels with four transistors each, global shutter pixels, time-of-flight pixels, etc. Additionally, the pixel shown in FIG. 3A may be implemented in a stacked-chip arrangement if desired. The pixel may be split between chips at any desired point within the pixel (e.g., between the transfer transistor and the floating diffusion region, between the source follower transistor and the row select transistor, etc.).

Figure 4:
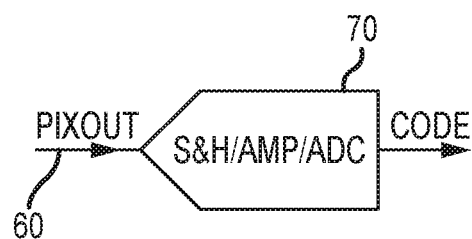
FIG. 4 is a schematic diagram showing a readout circuit for a pixel in accordance with an embodiment.

FIG. 4 shows a simplified drawing of readout circuitry 70. As shown, readout circuitry 70 may receive one or more signals (pixout) from the pixel from output path 60. The readout circuitry may store the analog signal and convert the signal to a digital signal that is output from the readout circuitry.

Figure 5:
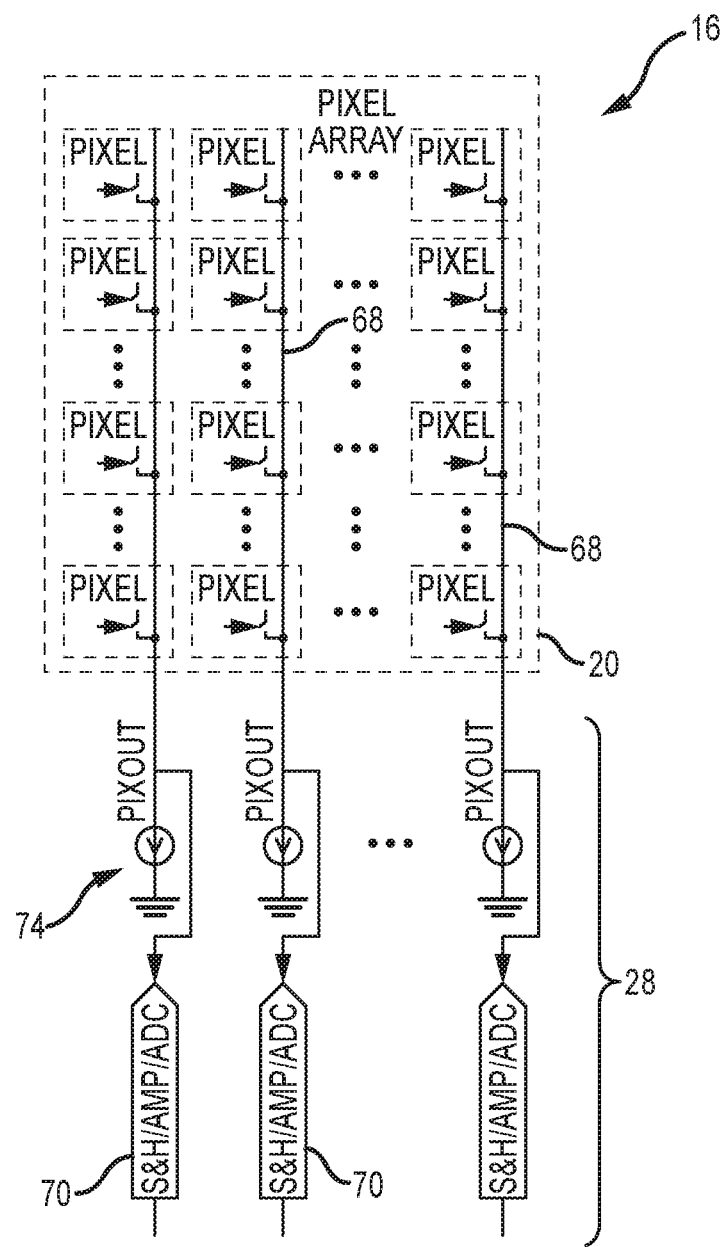
FIG. 5 is a top view of an illustrative image sensor that has an array of imaging pixels and that does not have any dark pixels in accordance with an embodiment.

FIG. 5 is a top view of an illustrative image sensor that does not have any dark pixels. As shown, pixel array 20 may include a number of imaging pixels 22. Each pixel may be coupled to a column output line 68. Each column output line may run throughout an entire column in the pixel array. Each column output line may be coupled to a respective current source 74 and readout circuit 70. Pixel array 20 in FIG. 5 may include any number of rows and columns of imaging pixels. For example, pixel array 20 may include more than one hundred rows, more than one thousand rows, more than two thousand rows, less than two thousand rows, or any other desired number of rows. Similarly, pixel array 20 may include more than one hundred columns, more than one thousand columns, more than two thousand columns, less than two thousand columns, or any other desired number of columns. Pixel array 20 may include the same number of columns and rows, more columns than rows, or more rows than columns. Each row of pixels may be read out in sequence. Because there are no dark pixels in the sensor shown in FIG. 5, the sensor may be susceptible to noise. In FIG. 5, the noise may be mixed into the pixel data. There may be structured row noise that produces artifacts that may be perceived by a user. To reduce noise within the sensor, dark pixels may be included in the sensor.

Figure 6:
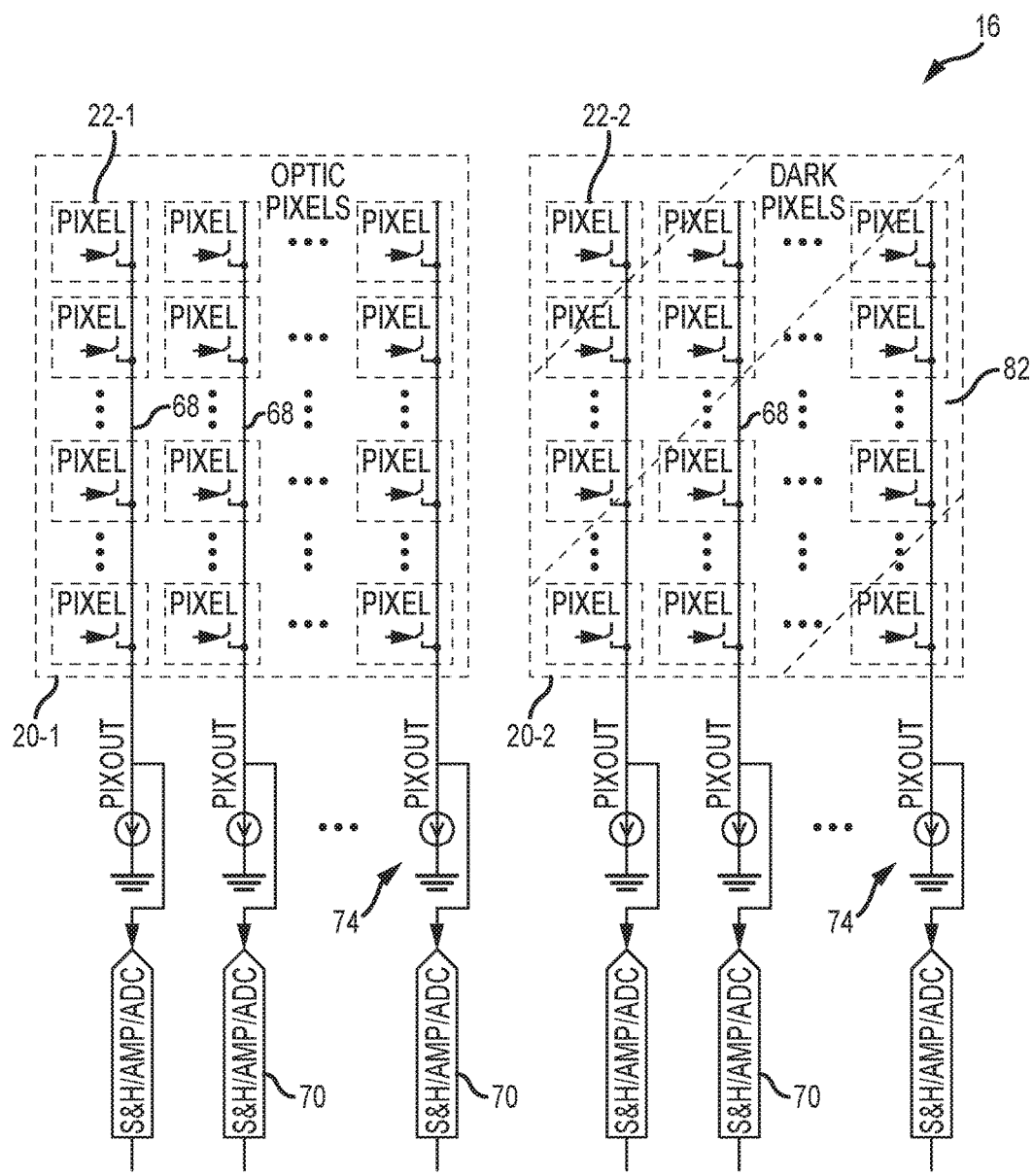
FIG. 6 is a top view of an illustrative image sensor that has an array of imaging pixels and a corresponding array of dark pixels in accordance with an embodiment.

FIG. 6 is a top view of an illustrative image sensor that has additional columns of dark pixels. As shown, sensor 16 may include an array of imaging pixels 22-1 (sometimes referred to as optical pixels) and an array of dark pixels 22-2. Array 20-1 of optical pixels and array 20-2 of dark pixels may have the same number of rows. Array 20-1 and array 20-2 may have the same number of columns or array 20-2 may have less columns than array 20-1. Array 20-2 may be covered by a shielding material 82 (e.g., metal or any other desired material that is opaque to incident light). During operation of the sensor, the dark pixels may be read out at the same time as the imaging pixels in the same row. The average dark pixel level of each row may then be determined. The average dark pixel level may correspond to the average amount of noise for that row. The average dark pixel level in each row may then be subtracted from each optical pixel sample in the respective row to correct for the noise. For example, after an integration time, the charge level of the first row of imaging pixels and the first row of dark pixels may be sampled by readout circuitry 70. The data from the dark pixels in the first row of dark pixels may be averaged. The average dark pixel charge level of the first row of dark pixels may then be subtracted from each detected charge level from the first row of optical pixels. Next, the charge level of the second row of imaging pixels and the second row of dark pixels may be sampled. The data from the dark pixels in the second row of dark pixels may be averaged. The average dark pixel charge level of the second row of dark pixels may then be subtracted from each detected charge level from the second row of optical pixels. This process may continue for each row in the array, with an average charge level from each row of dark pixels being subtracted from the charge levels detected by the optical pixels in the same row. In general, it may be desirable to include as many columns of dark pixels as possible to increase the accuracy of the noise correction. The more dark pixels present, the more accurate the noise correction process will be. However, the dark pixels may take up valuable space on the sensor.

Figure 7:
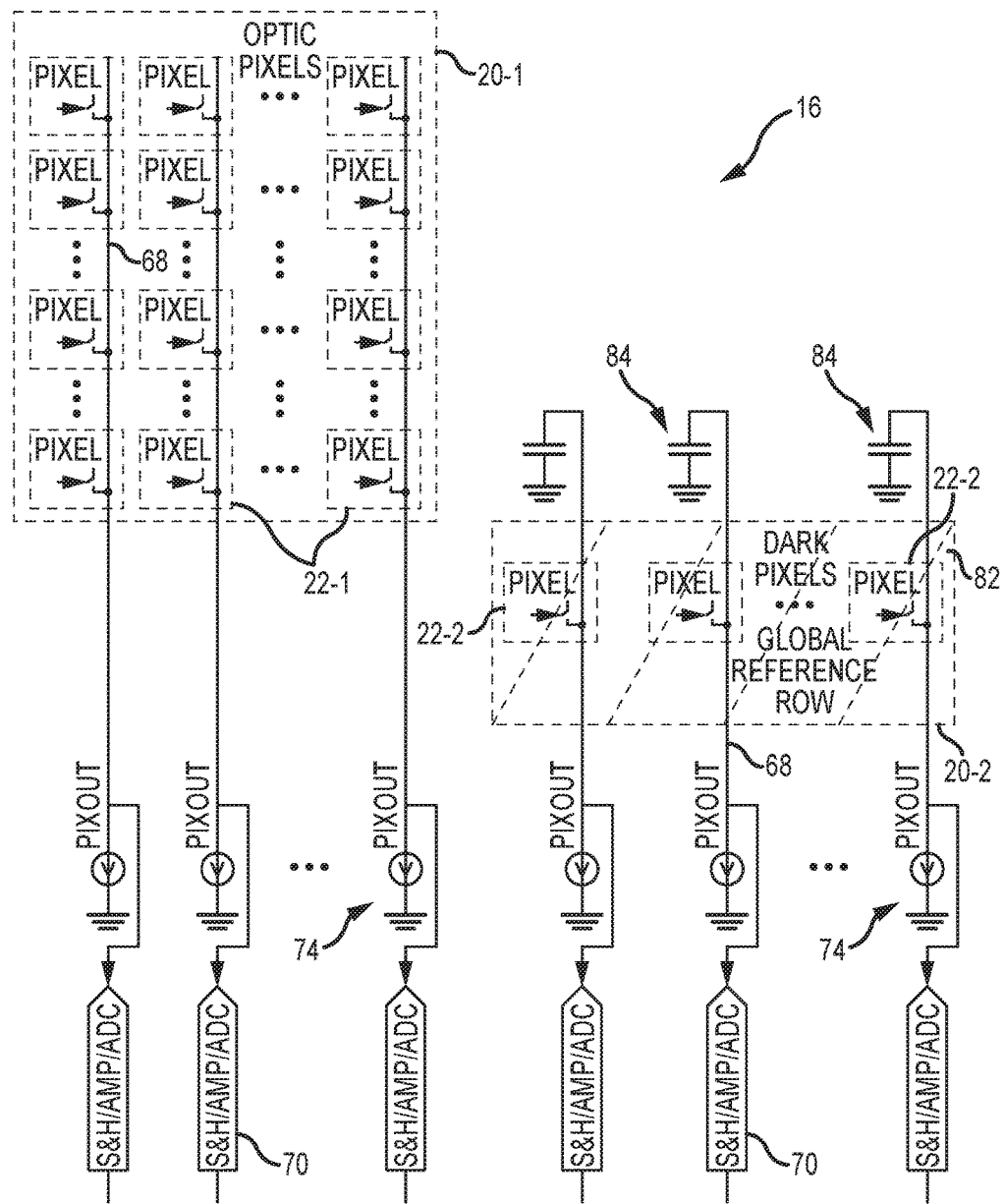
FIG. 7 is a top view of an illustrative image sensor that has an array of imaging pixels and a single row of dark pixels in accordance with an embodiment.

FIG. 7 is a top view of an illustrative image sensor with dark pixels for noise correction that take up less space on the image sensor than the dark pixels of FIG. 6. As shown in FIG. 7, sensor 16 may include an array of imaging pixels 22-1 (sometimes referred to as optical pixels) and a row of dark pixels 22-2. Array 20-1 of optical pixels may have any desired number of rows while only a single row 20-2 of dark pixels may be included. Array 20-1 and row 20-2 may have the same number of columns, or row 20-2 may have less columns than array 20-1. Row 20-2 may be covered by a shielding material 82 (e.g., metal or any other desired material that is opaque to incident light). In order to emulate the load of the output line of the optical pixels, one or more capacitors 84 may be included in each column of dark pixels. FIG. 7 shows one capacitor 84 coupled to each column line 68 of the dark pixels. This example is merely illustrative, however, and more than one capacitor may be coupled to each column line if desired.

During operation of the sensor, the dark pixels may be read out each time a row of optical pixels is read out. The average dark pixel level may correspond to the average amount of noise for that row. The average dark pixel level may then be subtracted from each optical pixel sample to correct for the noise. For example, after an integration time, the charge level of the first row of imaging pixels and the row of dark pixels may be sampled by readout circuitry 70. The data from the dark pixels in the row of dark pixels may be averaged. The average dark pixel charge level of the row of dark pixels may then be subtracted from each detected charge level from the first row of optical pixels. Next, the charge level of the second row of imaging pixels and the row of dark pixels may be sampled (i.e., the row of dark pixels may be sampled again). The data from the dark pixels in the row of dark pixels may be averaged. The average dark pixel charge level of the row of dark pixels may then be subtracted from each detected charge level from the second row of optical pixels. This process may continue for each row in the array, with an average charge level from the row of dark pixels being subtracted from the charge levels of the optical pixels in the particular row that is being sampled. Reusing the same row of dark pixels in this way vastly reduces the number of dark pixels in the sensor (i.e., only one row is needed instead of the same number of rows as there are imaging pixels). Because the dark pixels are used for each row of optical pixels, the row of dark pixels may be referred to as a global reference row.

In order to ensure noise correction of a desired accuracy, a certain number of columns may be required. For example, between two hundred and three hundred columns of dark pixels may be required. It may be desirable to reduce the amount of sensor area taken up the dark pixels. In FIG. 7, the dark pixels are arranged in a single row. To reduce the width of the sensor, the dark pixels may be instead arranged in multiple rows (i.e., instead of 1 row of 250 pixels, 2 rows of 125 pixels may be included).

Figure 8:
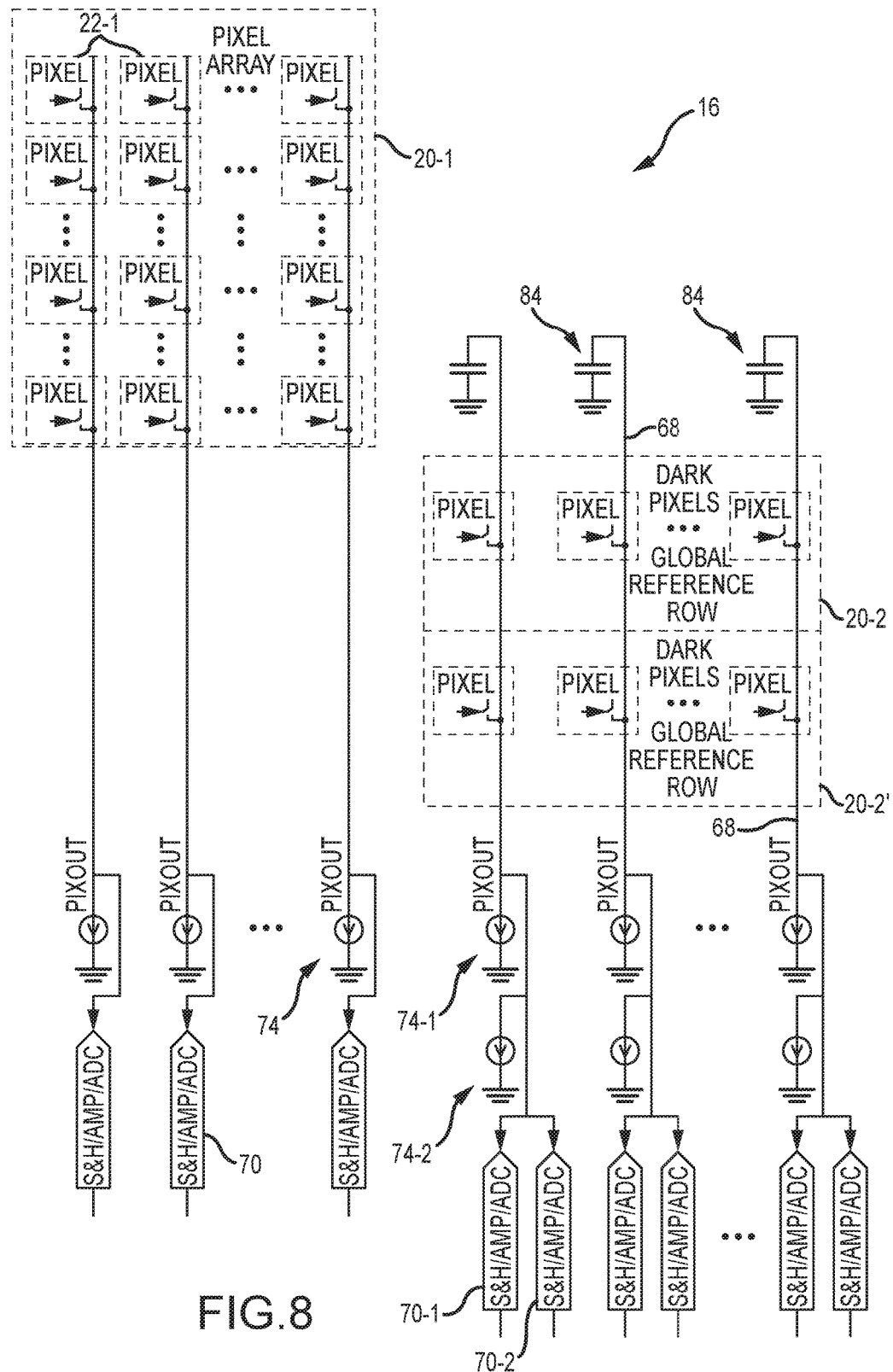
FIG. 8 is a top view of an illustrative image sensor that has an array of imaging pixels and multiple rows of dark pixels in accordance with an embodiment.

FIG. 8 is a top view of an image sensor with more than one global reference pixel row. As shown in FIG. 8, sensor 16 may include an array of imaging pixels 22-1 (sometimes referred to herein as optical pixels) and multiple rows of dark pixels 22-2 (sometimes referred to herein as reference pixels). In FIG. 8, a first row of dark pixels 20-2 and a second row of dark pixels 20-2' are shown. Array 20-1 of optical pixels may have any desired number of rows while only two rows of dark pixels may be included. Array 20-1 and array 20-2 may have the same number of columns, or rows 20-2 and 20-2' may have less columns than array 20-1. Rows 20-2 and 20-2' may have the same number of columns or a different number of columns. Rows 20-2 and 20-2' may be covered by a shielding material 82 (e.g., metal or any other desired material that is opaque to incident light). In order to emulate the load of the output line of the optical pixels, one or more capacitors 84 may be included in each column of dark pixels. FIG. 8 shows one capacitor 84 coupled to each column line 68 of the dark pixels. This example is merely illustrative, however, and more than one capacitor may be coupled to each column line if desired.

Every pixel in both rows 20-2 and 20-2' of dark pixels may be sampled simultaneously during operation of sensor 16. This means that, because pixels in the same column are shorted together by the column line 68, the pixel outputs of both rows will be summed together on column line 68. However, because the dark pixel levels will eventually all be summed and averaged, this does not negatively affect the noise correction performance. Each column line 68 may be coupled to first and second current sources 74-1 and 74-2 as well as first and second readout circuits 70-1 and 70-2. Using a current source and a readout circuit for each pixel in the column may ensure better correlation between the dark pixels and the optical pixels. Using the same number of current sources and readout circuits as there are pixels coupled to a column line may maximize the effectiveness of the noise correction.

During operation of the sensor, both rows of dark pixels may be read out each time a row of optical pixels is read out. The average dark pixel level may correspond to the average amount of noise for that row. The average dark pixel level may then be subtracted from each optical pixel sample to correct for the noise. For example, after an integration time, the charge level of the first row of imaging pixels and both rows of dark pixels may be sampled by readout circuitry 70. The data from the dark pixels in the rows of dark pixels may be averaged. The average dark pixel charge level of both rows of dark pixels may then be subtracted from each detected charge level from the first row of optical pixels. Next, the charge level of the second row of imaging pixels and both rows of dark pixels may be sampled (i.e., both rows of dark pixels may be sampled again). The data from the dark pixels in the rows of dark pixels may be averaged. The average dark pixel charge level of the dark pixels may then be subtracted from each detected charge level from the second row of optical pixels. This process may continue for each row in the array, with an average charge level from the rows of dark pixels being subtracted from the charge levels of the optical pixels in the particular row that is being sampled. Reusing the rows of dark pixels in this way vastly reduces the number of dark pixels in the sensor. Additionally, by splitting the global reference row into two dark pixel rows, the width of the imaging sensor may be reduced.

In various embodiments, an imaging sensor may include an array of imaging pixels and first and second rows of dark pixels. Each imaging pixel may include a photodiode that generates charge in response to incident light and the imaging pixels may be arranged in a first plurality of rows and a first plurality of columns. Each dark pixel may include a photodiode, the first and second rows of dark pixels may have a second plurality of columns, and each column of the second plurality of columns may include a column line that is coupled to first and second readout circuits.

Shielding material may cover the dark pixels to prevent incident light from reaching the photodiodes of the dark pixels. Each column line may be coupled to first and second current sources. Each column line may be coupled to at least one capacitor. A first dark pixel may be positioned in the first row of dark pixels and a second dark pixel may be positioned in the second row of dark pixels. The first and second dark pixels may both be positioned in a first column of the second plurality of columns. The first and second dark pixels may both be coupled to a first column line. The first column line may be the only column line coupled to the first and second dark pixels. The first and second dark pixels may be configured to generate charge and the first and second dark pixel charge levels may be configured to be sampled simultaneously using the first column line. The first and second readout circuits may each include first and second storage capacitors.

In various embodiments, an imaging sensor may include a first plurality of pixels with photodiodes that are covered by shielding material and a second plurality of pixels with photodiodes. The first plurality of pixels may include at least two rows of pixels, the photodiodes of the first plurality of pixels may be configured to generate charge during an integration time, and the charge generated by each photodiode of the first plurality of pixels during the integration time may be configured to be sampled simultaneously. The second plurality of pixels may include a plurality of rows and a plurality of columns, the photodiodes of the second plurality of pixels may be configured to generate charge during the integration time, and the charge generated by each photodiode of the second plurality of pixels during the integration time may be configured to be sampled one row at a time.

The first plurality of pixels may include an additional plurality of columns, and each column of the additional plurality of columns may include a column line. Each column line may be coupled to at least two readout circuits, and there may be one readout circuit coupled to the column line for each row of pixels in the first plurality of pixels. Each column line may be coupled to at least two current sources, and there may be one current source coupled to the column line for each row of pixels in the first plurality of pixels. The at least two rows of pixels may include a first number of rows of pixels, each column line may be coupled to a second number of readout circuits, and the first number may be equal to the second number. Each column line may be coupled to a third number of current sources and the first number may be equal to the third number. There may be less columns in the additional plurality of columns than in the plurality of columns.

A method of operating an imaging sensor that includes an array of optical pixels and at least two rows of reference pixels may include generating charge in response to incident light during an integration time with each optical pixel in the array of optical pixels, generating charge during the integration time with each reference pixel in the at least two rows of reference pixels, simultaneously sampling the charge generated by each reference pixel to determine the average charge generated by the at least two rows of reference pixels, sampling the charge generated by each optical pixel, and correcting the samples from each optical pixel based on the average charge generated by the at least two rows of reference pixels. The at least two rows of reference pixels may include a plurality of columns and each column of the plurality of columns may include a column line. Each column line may be coupled to at least two readout circuits. Each column line may be coupled to at least two current sources. Simultaneously sampling the charge generated by each reference pixel may include summing the charge from the pixels in each column of the plurality of columns on the respective column line.

The foregoing is merely illustrative of the principles of this invention and various modifications can be made by those skilled in the art. The foregoing embodiments may be implemented individually or in any combination.

What is claimed is:

1. An imaging sensor comprising:
an array of imaging pixels, wherein each imaging pixel comprises a photodiode that generates charge in response to incident light and wherein the imaging pixels are arranged in a first plurality of rows and a first plurality of columns; and
first and second rows of dark pixels, wherein each dark pixel comprises a photodiode, wherein the first and second rows of dark pixels have a second plurality of columns, and wherein each column of the second plurality of columns comprises a column line that is coupled to respective first and second readout circuits.

2. The imaging sensor defined in claim 1, wherein shielding material covers the dark pixels to prevent incident light from reaching the photodiodes of the dark pixels.

3. The imaging sensor defined in claim 1, wherein each column line is coupled to respective first and second current sources.

4. The imaging sensor defined in claim 1, wherein each column line is coupled to at least one capacitor.

5. The imaging sensor defined in claim 1, wherein a first dark pixel is positioned in the first row of dark pixels and a second dark pixel is positioned in the second row of dark pixels, wherein the first and second dark pixels are both positioned in a first column of the second plurality of columns, and wherein the first and second dark pixels are both coupled to a first column line.

6. The imaging sensor defined in claim 5, wherein the first column line is the only column line coupled to the first and second dark pixels.

7. The imaging sensor defined in claim 6, wherein the first and second dark pixels are configured to generate charge and wherein the first and second dark pixel charge levels are configured to be sampled simultaneously using the first column line.

8. The imaging sensor defined in claim 1, wherein the first and second rows of dark pixels are part of a first number of total rows of dark pixels, wherein each column line is coupled to a second number of readout circuits, and wherein the first number is equal to the second number.

9. An imaging sensor comprising:
a first plurality of pixels with photodiodes that are covered by shielding material, wherein the first plurality of pixels includes a first plurality of rows of pixels and a first plurality of columns of pixels, wherein the photodiodes of the first plurality of pixels are configured to generate charge during an integration time, and wherein the charge generated by each photodiode of the first plurality of pixels during the integration time is configured to be sampled simultaneously; and
a second plurality of pixels with photodiodes, wherein the second plurality of pixels includes a second plurality of rows and a second plurality of columns, wherein the photodiodes of the second plurality of pixels are configured to generate charge during the integration time, and wherein the charge generated by each photodiode of the second plurality of pixels during the integration time is configured to be sampled one row at a time.

10. The imaging sensor defined in claim 9, wherein each column of the first plurality of columns includes a column line.

11. The imaging sensor defined in claim 10, wherein each column line is coupled to at least two readout circuits and wherein there is one readout circuit coupled to the column line for each row of pixels in the first plurality of pixels.

12. The imaging sensor defined in claim 11, wherein each column line is coupled to at least two current sources and wherein there is one current source coupled to the column line for each row of pixels in the first plurality of pixels.

13. The imaging sensor defined in claim 10, wherein the first plurality of rows of pixels comprise a first number of rows of pixels, wherein each column line is coupled to a second number of readout circuits, and wherein the first number is equal to the second number.

14. The imaging sensor defined in claim 13, wherein each column line is coupled to a third number of current sources and wherein the first number is equal to the third number.

15. The imaging sensor defined in claim 10, wherein there are less columns in the first plurality of columns than in the second plurality of columns.

16. The imaging sensor defined in claim 10, wherein each column line is coupled to at least two readout circuits.

17. A method of operating an imaging sensor that includes an array of optical pixels and at least two rows of reference pixels, wherein the at least two rows of reference pixels includes a plurality of columns and wherein each column of the plurality of columns includes a column line that is coupled to at least two respective current sources, the method comprising:
with each optical pixel in the array of optical pixels, generating charge in response to incident light during an integration time;
with each reference pixel in the at least two rows of reference pixels, generating charge during the integration time;
simultaneously sampling the charge generated by each reference pixel to determine the average charge generated by the at least two rows of reference pixels;
sampling the charge generated by each optical pixel; and
correcting the samples from each optical pixel based on the average charge generated by the at least two rows of reference pixels.

18. The method defined in claim 17, wherein each column line is coupled to at least two respective readout circuits.

19. The method defined in claim 17, wherein simultaneously sampling the charge generated by each reference pixel comprises summing the charge from the pixels in each column of the plurality of columns on the respective column line.

* * * * *